United States Patent [19]
Gooch, IV et al.

[11] Patent Number: 5,125,625
[45] Date of Patent: Jun. 30, 1992

[54] QUICK VENT CLOSURE ASSEMBLY FOR PRESSURIZED WATER REACTOR

[75] Inventors: Henry H. Gooch, IV; Ronald C. Pillow, both of Lynchburg; Robert C. Smith, Forest, all of Va.

[73] Assignee: B&W Nuclear Service Company, Lynchburg, Va.

[21] Appl. No.: 715,953

[22] Filed: Jun. 17, 1991

[51] Int. Cl.$^5$ .............................. F16K 31/00
[52] U.S. Cl. .......................... 251/349; 251/82; 251/285
[58] Field of Search ............ 251/349, 363, 82, 285, 251/282; 137/533.11, 533.13, 533.15

[56] References Cited

U.S. PATENT DOCUMENTS

| | | | |
|---|---|---|---|
| 1,334,566 | 3/1920 | Steinmetz | 251/282 |
| 1,430,505 | 9/1922 | Hinchman | 251/285 |
| 1,877,938 | 9/1932 | Moore | 251/285 |
| 2,905,198 | 9/1959 | Peeps et al. | 251/285 |
| 4,281,775 | 8/1981 | Turner | 251/282 |

FOREIGN PATENT DOCUMENTS

| | | | |
|---|---|---|---|
| 1901958 | 8/1970 | Fed. Rep. of Germany | 251/349 |
| 3539798 | 5/1987 | Fed. Rep. of Germany | 137/592 |
| 538380 | 6/1922 | France | 251/349 |

*Primary Examiner*—A. Michael Chambers
*Attorney, Agent, or Firm*—Robert J. Edwards; Michael L. Hoelter

[57] ABSTRACT

This invention pertains to a method and apparatus for venting pressure from within a pressurized housing. It incorporates a sealing assembly that is secured within a housing and restrained against a pressurized channel by a nut. By loosening the nut, restraint on the sealing assembly is released thereby allowing fluid from the channel to travel the length of the sealing assembly and exit the housing. Conversely, by tightening the nut, restraint on the sealing assembly is reapplied which blocks the channel once again thereby preventing any more fluid from flowing.

28 Claims, 2 Drawing Sheets

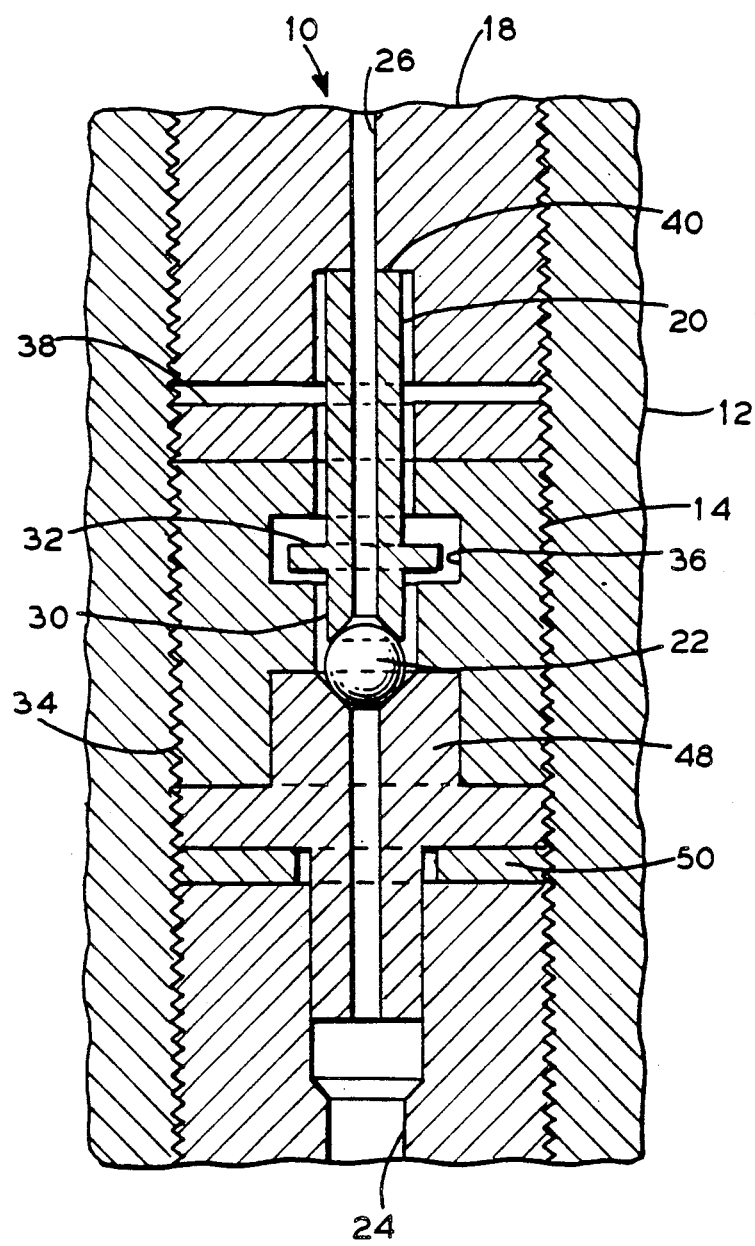

QUICK VENT CLOSURE ASSEMBLY FOR PRESSURIZED WATER REACTOR

FIELD OF THE INVENTION

This invention pertains to pressurized water reactors and more particularly to a method and apparatus for venting air and other fluids trapped within the primary coolant system.

BACKGROUND OF THE INVENTION

When filling the primary coolant system of a pressurized water reactor, it is important to remove any gases that may become trapped therein so as to completely fill the system. In the past, vent systems have required the utilization of a special tool and the attachment of a temporary vent line that was both time consuming and costly since the special hardware needed was not always immediately available.

In one instance, a housing nut on the vent had to be removed and a venting tool inserted therein to rotate an enclosed vent stem. This, in turn, would release a ball allowing it to float upward thereby unblocking a channel and permitting the primary coolant system to be vented. Once vented, the filling of the primary coolant system could continue to completion.

While this system is similar in type to those found in a number of facilities, their operation is critically dependant upon the possession of special hardware. It also requires the insertion of this hardware within the vent to release a component therein. Thus, there is always the possibility that the hardware will not be available when needed or that damage will be done to the interior of the vent thereby making it inoperable.

It is thus an object of this invention to provide a vent for pressurized water reactors which does not require the utilization of special, one-of-a-kind hardware. It is another object of this invention to provide a vent that can be operated without requiring the insertion of a tool within the vent. It is another object of this invention to reduce the time required for venting the coolant system. A further object of this invention is to provide a vent having a replaceable seat or a quick connect fitting should such be desired. These and other objects will become obvious upon further investigation.

SUMMARY OF THE INVENTION

What is disclosed herein is a method and apparatus for venting pressure from within a pressurized housing. The apparatus incorporates a sealing assembly that is secured within the housing and is configured to block a pressurized channel in the housing. This sealing assembly is movable between channel blocking and channel unblocking positions. A nut threadably secured to the housing is configured to both engage the sealing assembly and to restrain the sealing assembly in the channel blocking position. To vent pressure, the nut is loosened, such as by an open end wrench, thereby releasing restraint on the sealing assembly. This causes the sealing assembly to now be movable between channel blocking and channel unblocking position. A passageway is provided within the sealing assembly that connects to the channel thereby providing a means for venting the fluid under pressure when the sealing assembly is in the channel unblocking position. Stop means are also provided to limit the movement of the sealing assembly when the nut is unthreaded.

BRIEF DESCRIPTION OF THE DRAWINGS

FIG. 2 is a front pictorial view, partially broken away, illustrating the arrangement and location of the replaceable seat.

DETAILED DESCRIPTION OF THE DRAWINGS

Figure 1:
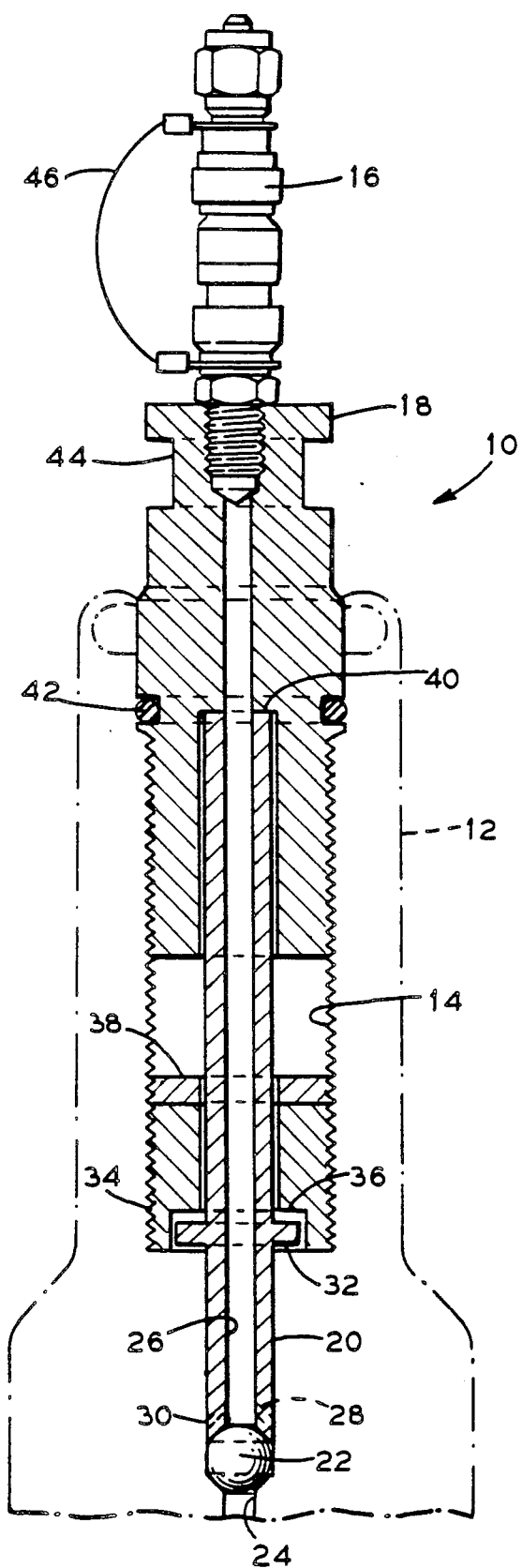
FIG. 1 is a front pictorial view, partially broken away, of the invention illustrating its various components.

Referring initially to FIG. 1, there is shown vent system 10 secured within pressure housing 12 such as by threads 14. Vent system 10 encompasses quick connect fittings 16, vent nut 18, vent stem 20, and sealing member or ball 22. During operation, vent nut 18 is loosened slightly thereby releasing restraint on stem 20 which, in turn, releases restraint on sealing member 22. As sealing member 22 becomes free to move, the pressure within channel 24 causes sealing member 22 to move upward thereby unblocking channel 24. This enables any fluid (such as trapped gases) within channel 24 to travel the length of passageway 26 up to quick connect fittings 16 for release into a hose leading to an overflow tank, as desired. When it becomes desirable to again block channel 24, nut 18 is tightened which moves stem 20 downward thereby causing sealing member 22 to once again seal channel 24.

As shown, sealing member 22 is sized to block channel 24 when pressed against it, but to allow the flow of fluid around it when restraint on sealing member 22 is released. This is accomplished by sizing sealing member 22 larger that channel 24 but smaller than the opening into which sealing member 22 is placed. In this fashion, when channel 24 becomes unblocked, the fluid will flow upward around sealing member 22 and toward passageway 26. As shown in FIG. 1, sealing member 22 is a spherical ball, but it could be of any other design that will seal channel 24 while also permitting the flow of fluid around it when channel 24 is unblocked. Sealing member 24 could also form a part of stem 20 rather than be a separate member as shown.

Once the restraint upon sealing member 22 is released, the pressure within channel 24 will cause sealing member 22 to rise thereby releasing fluid into venting system 10. This fluid will pass through a series of small portals 28 etched into end 30 of stem 20 before it flows into passageway 26 in stem 20. In this fashion, end 30 is configured to both retain sealing member 22 against channel 24 when channel 24 is to be blocked and to allow fluid from channel 24 to freely flow around sealing member 22 and into passageway 26 when channel 24 is unblocked.

In permitting fluid to flow, stem 20 must be moved upward, however, this upward movement is limited so that control of fluid flow is never lost. It is also important not to let stem 20 "blow out" of pressure housing 12 due to the greater pressure in channel 24. This is accomplished by configuring stem 20 with tabs 32 that extend within and engage notch 36 in stop 34. Thus, even should all restraint upon stem 20 by nut 18 be released, the fluid within channel 24 would not issue forth uncontrollably nor would stem 20 be allowed to come out of housing 12. Instead, stop 34 would limit the upward movement of stem 20 to that which is acceptable.

Stop 34 is configured as shown with notch 36 into which tab 32 extends. Stop 34 is held in place against pressure housing 12 by lock nut 38 which is threaded onto threads 14. Should greater upward movement of stem 20 be desired, lock nut 38 would be rotated upward accordingly. Generally, however, the size of notch 36 allows for a sufficient range of movement of stem 20 so that lock nut 38 need not be raised from the position shown. Both stop 34 and lock nut 38 have openings therein for the passage of stem 20 therethrough. They both also provide lateral support to stem 20 within housing 12.

Stem 20 is held in place within system 10 by vent nut 18. When nut 18 is tightened, shoulder 40 presses stem 20 downward against the upward force applied to sealing member 22. This downward force keeps sealing member 22 sealed against channel 24. When nut 18 is rotated upward or loosened, shoulder 40 raises which enables stem 20 to rise under pressure thereby releasing restraint upon sealing member 22. Passageway 26 is continuous through nut 18 so that any fluid released will flow upward through both stem 20 and nut 18. Seal or O-ring 42 seals nut 18 within housing 12 to prevent any leakage around threads 14. Additionally, threads 14 may be internal threads as shown in the figures or threads 14 may be external threads, either will suffice.

Vent nut 18 is configured so that a simple open end wrench can be used to rotate nut 18 as desired. This wrench would engage flat surface 44 on the exterior of nut 18 for such rotation. The flat surface could also be provided in a hexagon shape configuration so that a socket wrench could be used. Generally, since stem 20 is limited in its movement by the size of notch 36, nut 18 need only be loosened a quarter-turn or so to achieve such movement.

Quick connect fittings 16 are threadably sealed onto the top of nut 18 as shown. Fittings 16 couple with passageway 26 and permits the fluid contained therein to be released to the atmosphere or to be directed to an overflow tank, as desired. Its upper portion is secured to its main body portion by cord 46 so that it will not become lost.

Referring now to FIG. 2, there is shown an alternate embodiment of the invention. In this embodiment, sealing member 22 seals against replaceable seat piece 48 which pushes against seal or Helico-Flex member 50. Seat piece 48 defines channel 24 as shown and stop 34, with notch 36, serves the same function as described above even though it is configured differently. Other configurations of the various components of system 10 are equally likely, their function and purpose being the same as just described herein.

What is claimed as invention is:

1. A venting apparatus for venting pressure from within a pressurized housing comprising;
    a) a sealing assembly secured within the housing and configured to block a pressurized channel, said sealing assembly being movable between channel blocking and channel unblocking positions;
    b) a nut threadably secured to the housing and configured to engage said sealing assembly, said nut restricting said sealing assembly in said channel blocking position;
    c) operating means for selectively loosening said nut thereby releasing restraint on said sealing assembly, said sealing assembly now being movable between said channel blocking and said channel unblocking positions;
    d) a passageway connecting to the channel when said sealing assembly is in said channel unblocking position, said passageway leading out of the housing; and,
    e) stop means secured to the housing for limiting the movement of said sealing assembly when said nut is unthreaded.

2. The apparatus as set forth in claim 1 wherein said passageway extends through both said sealing assembly and said nut.

3. The apparatus as set forth in claim 2 wherein said sealing assembly comprises an elongated vent stem having a first end in engagement with said nut and having a second end configured to seal the channel.

4. The apparatus as set forth in claim 3 wherein said second end of said vent stem is configured to engage a sealing member that seals the channel, said second end having portals in communication with the channel when said sealing assembly is in said channel unblocking position.

5. The apparatus as set forth in claim 4 wherein said sealing member is a ball that is sized to seat against and seal the channel.

6. The apparatus as set forth in claim 4 wherein the channel is configured with a replaceable seat.

7. The apparatus as set forth in claim 4 wherein the location of said stop means in the housing is threadably adjustable.

8. The apparatus as set forth in claim 7 wherein said nut is configured to be loosened via a wrench.

9. The apparatus as set forth in claim 8 further comprising quick connect fittings secured to said nut.

10. A venting apparatus secured to a pressure housing comprising:
    a) sealing means for selectively blocking a pressurized channel within the housing;
    b) a vent stem movable between a restrained position wherein the channel is blocked and an unretrained position wherein the channel is unblocked;
    c) a rotatable nut threadably secured to the housing and configured to engage said stem, said nut selectively rotated to alternately restrain said stem and to release restraint on said stem;
    d) a passageway through both said stem and said nut, said passageway being continuous with the channel for the passage of fluid therethrough; and,
    e) stop means for limiting the movement of said stem.

11. The apparatus as set forth in claim 10 wherein said nut is adapted to accept quick connect fittings thereto.

12. The apparatus as set forth in claim 10 wherein said stop means comprise a tab secured to said stem and a stop block secured to the housing.

13. The apparatus as set forth in claim 12 wherein said stop block is threadably secured by a lock nut and wherein said stop block is positionable, as desired, within the housing.

14. The apparatus as set forth in claim 13 wherein said stem is configured with portals permitting the flow of fluid from the channel to said passageway.

15. The apparatus as set forth in claim 14 wherein said portals are located adjacent said sealing means.

16. The apparatus as set forth in claim 15 wherein said sealing means comprises a ball.

17. The apparatus as set forth in claim 16 wherein said nut is configured to be rotated by a wrench.

18. The apparatus as set forth in claim 17 wherein said ball seals against a replaceable seat.

19. A method of venting pressure from within a pressurized housing comprising the steps of:

a) sealing a pressurized channel within the housing by a sealing assembly, said assembly being movable between channel blocking and channel unblocking positions;

b) threadably securing a nut to the housing to engage said sealing assembly and to restrain said sealing assembly in said channel blocking position;

c) selectively loosening said nut thereby releasing restraint on said sealing assembly, said sealing assembly now being movable between said channel blocking and said channel unblocking positions;

d) providing a passageway out of the housing that is continuous with the channel when said sealing assembly is in said channel unblocking position; and, e) limiting the movement of said sealing assembly when said nut is unthreaded.

20. The method as set forth in claim 19 further comprising the step of attaching quick connect fittings to said nut.

21. The method as set forth in claim 19 wherein said passageway out of the housing extends through said sealing assembly and said nut.

22. The method as set forth in claim 21 wherein said sealing assembly comprises an elongated vent stem having a first end in contact with said nut and having a second end configured to seal the channel.

23. The method as set forth in claim 22 wherein said second end of said vent stem is configured to engage a sealing member that seals the channel, said second end having portals in communication With the channel when said sealing assembly is in said channel unblocking position.

24. The method as set forth in claim 23 wherein said sealing member is a ball that is sized to seat against and seal the channel.

25. The method as set forth in claim 23 wherein the channel is configured with a replaceable seat.

26. The method as set forth in claim 23 wherein said limiting step comprises the step of securing stopping means to the housing for limiting the movement of said sealing assembly.

27. The method as set forth in claim 26 wherein the location of said stopping means in the housing is threadably adjustable.

28. The method as set forth in claim 27 wherein said nut is configured to be loosened via a wrench.

* * * * *